(12) United States Patent
Ng et al.

(10) Patent No.: US 9,689,426 B2
(45) Date of Patent: Jun. 27, 2017

(54) LINEAR MOTION BEARING WITH MODULAR BEARING SEGMENTS

(71) Applicant: Thomson Industries, Amherst, NY (US)

(72) Inventors: Alison Ng, New York, NY (US); Juan Pablo Geraldo Romero, Tijuana (MX); Pablo Alfonso Olachea Quiñones, Tijuana (MX)

(73) Assignee: Thomson Industries Inc., Amherst, NY (US)

( * ) Notice: Subject to any disclaimer, the term of this patent is extended or adjusted under 35 U.S.C. 154(b) by 47 days.

(21) Appl. No.: 14/610,344

(22) Filed: Jan. 30, 2015

(65) Prior Publication Data

US 2015/0139572 A1    May 21, 2015

Related U.S. Application Data

(63) Continuation-in-part of application No. 13/810,262, filed as application No. PCT/US2011/044161 on Jul. 15, 2011, now abandoned.

(60) Provisional application No. 61/364,532, filed on Jul. 15, 2010.

(51) Int. Cl.
*F16C 29/06* (2006.01)
*F16C 29/00* (2006.01)

(52) U.S. Cl.
CPC ........ *F16C 29/0602* (2013.01); *F16C 29/069* (2013.01); *F16C 29/0676* (2013.01); *F16C 29/001* (2013.01); *F16C 29/0623* (2013.01)

(58) Field of Classification Search
CPC ................ F16C 17/022; F16C 29/0607; F16C 29/0611; F16C 29/067; F16C 29/0676; F16C 29/0679; F16C 29/0688; F16C 29/0685; F16C 29/069; F16C 29/0614; F16C 29/0623; F16C 29/001; F16C 29/0602
USPC .............................. 384/43–46, 49–50, 52, 57
See application file for complete search history.

(56) References Cited

U.S. PATENT DOCUMENTS

| | | | |
|---|---|---|---|
| 2,628,135 A | | 2/1953 | Magee |
| 3,545,826 A | * | 12/1970 | Magee ................. F16C 29/001 384/43 |
| 3,767,276 A | | 10/1973 | Henn |
| 3,900,233 A | * | 8/1975 | Thomson ............... B21H 7/187 384/43 |
| 3,951,472 A | * | 4/1976 | Schurger ............... F16C 29/069 384/43 |

(Continued)

FOREIGN PATENT DOCUMENTS

| | | |
|---|---|---|
| DE | 2922625 A1 | 12/1980 |
| WO | 97/01713 A1 | 1/1997 |

(Continued)

*Primary Examiner* — Marcus Charles
(74) *Attorney, Agent, or Firm* — Dilworth & Barrese, LLP

(57) ABSTRACT

A modular bearing segment is disclosed. The modular bearing segment having a first end and a second end and can include a retainer defining at least one bearing track having an open load bearing portion; a plurality of bearings positioned within the at least one bearing track; a bearing plate in load bearing communication with less than all of the plurality of bearings and positioned opposite the retainer; and a lid positioned on the bearing plate, fixed to the retainer and defining a rocker element retaining hole positioned above the bearing plate.

20 Claims, 15 Drawing Sheets

(56) References Cited

U.S. PATENT DOCUMENTS

| | | | | |
|---|---|---|---|---|
| 4,138,167 A | * | 2/1979 | Ernst | F16C 29/069 384/43 |
| 4,406,502 A | * | 9/1983 | Teramachi | F16C 29/0697 384/45 |
| 4,444,443 A | * | 4/1984 | Teramachi | F16C 29/0697 384/43 |
| 4,469,380 A | | 9/1984 | Cowles, Sr. | |
| 4,480,879 A | * | 11/1984 | Reith | F16C 29/0688 384/43 |
| 4,659,239 A | * | 4/1987 | Teramachi | F16C 29/0695 384/45 |
| 5,046,862 A | | 9/1991 | Ng | |
| 5,207,510 A | * | 5/1993 | Polyak | F16C 29/0678 384/43 |
| 5,346,313 A | | 9/1994 | Ng | |
| 5,558,442 A | | 9/1996 | Ng | |
| 5,613,780 A | | 3/1997 | Ng | |
| 5,921,682 A | * | 7/1999 | Kitade | F16C 29/0602 348/478 |
| 6,637,941 B2 | * | 10/2003 | Greiner | F16C 29/0695 384/43 |
| 6,805,637 B2 | | 10/2004 | Daenzer et al. | |
| 8,317,397 B2 | | 11/2012 | Klein | |
| 2002/0067868 A1 | * | 6/2002 | Lyon | F16C 13/04 384/43 |
| 2008/0107365 A1 | | 5/2008 | Mueller | |
| 2013/0216164 A1 | | 8/2013 | Ng | |

FOREIGN PATENT DOCUMENTS

| | | |
|---|---|---|
| WO | 9925983 A1 | 5/1999 |
| WO | 00/25034 A1 | 5/2000 |
| WO | 2012/009623 A1 | 1/2012 |

* cited by examiner

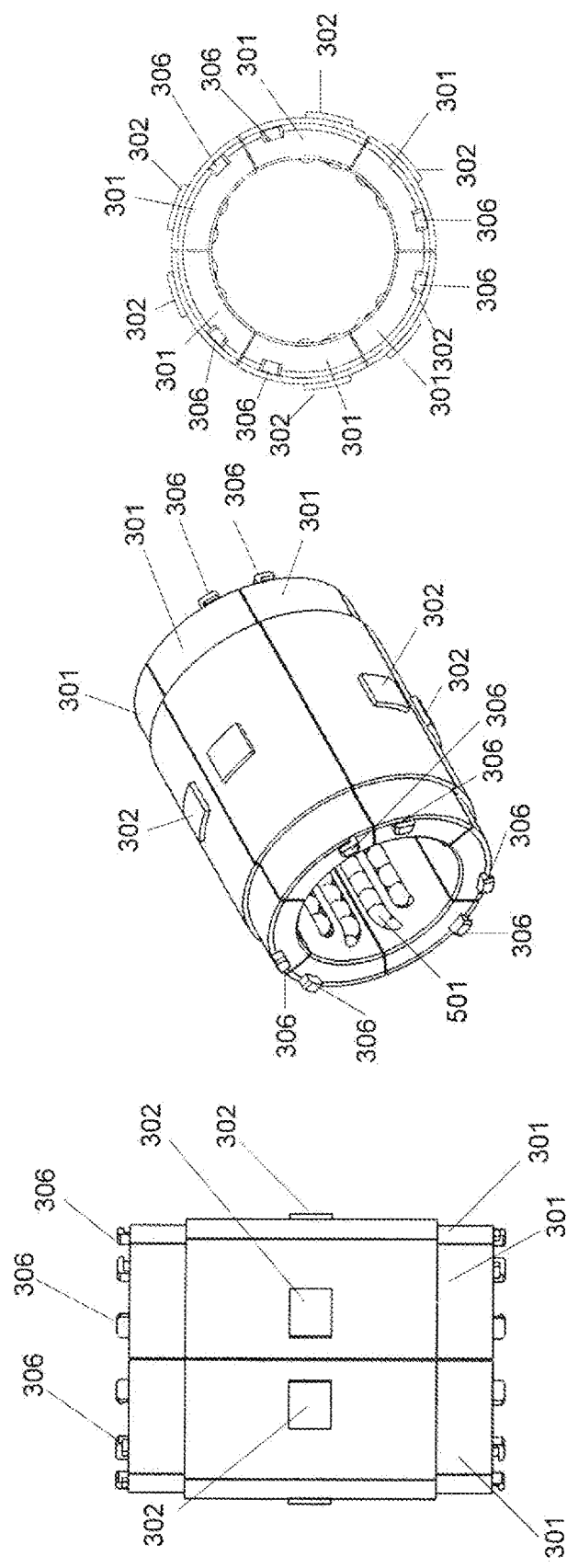

US 9,689,426 B2

LINEAR MOTION BEARING WITH MODULAR BEARING SEGMENTS

REFERENCE TO PRIOR APPLICATIONS

This application is a continuation-in-part of U.S. application Ser. No. 13/810,262, filed Mar. 28, 2013, which is the National Stage of International Application No. PCT/US2011/044161, filed Jul. 15, 2011, which claims the benefit of U.S. Provisional Application No. 61/364,532, filed Jul. 15, 2010, the entire contents of each of which is hereby incorporated by reference.

BACKGROUND OF THE INVENTION

This disclosure relates to a linear bearing. In a linear motion bearing, a generally cylindrical housing is designed to move relative to a shaft. The housing includes a ball retaining structure comprising a plurality of ball retaining elements. Each ball retaining element includes a plurality of ball bearings moveable in a track. The elements are mounted within the housing so that movement of the housing with respect to the shaft is effectuated through engagement of the bearings with the shaft. As the housing moves, the ball bearings move in respective tracks.

Prior art systems included ball retainer structures that needed to be individually assembled and carefully fitted into an outer assembly. Each component, including all of the ball bearings were loose elements that required time-consuming and expensive manufacturing processes. Should one retainer structure become loose, all of the ball bearings would disassemble and require a complete reassembly.

FIGS. 1 and 2 illustrate a prior art linear motion bearing assembly 40. The bearing assembly includes ball retainer element 42, load bearing plates 44, ball bearings 46, ball retainer segments 54, outer housing sleeves 48, 50 and bearing plate to housing intermediary load structure 52. In prior art bearing assembly 40, the ball retainer structure 42 included a plurality of ball retainer segments 54, each operatively associated with an adjacent ball retainer segments along longitudinal sides thereof to form a ball retainer structure having a bore there through for receiving a shaft. Each ball retainer segment 54 included an outer radial surface 56 and an inner radial surface 58. Axial ball tracks 60 were formed in the outer radial surface 56 of each ball retainer segment 54 and include load bearing portions 62, return portions 64 and turnarounds 66. A longitudinal bore 68 in the inner radial surface 58 of the ball retainer segment 54 extends substantially the length of the load bearing portions 62 and accesses support shaft 70.

A plurality of ball bearings 46 were disposed in the ball tracks 60 with those ball bearings 46 in the load bearing tracks 62 extending at least partially into longitudinal bores 68 to contact support shaft 70. A locking structure in the form of locking clips 72 were formed on opposing longitudinal ends of each ball retainer segment 54 to facilitate assembly with outer housing sleeves 48, 50.

To assemble the bearing assembly shown in FIG. 1, the ball bearings 46 needed to be placed within a ball retainer segment 54. A load bearing plate 44 was then placed upon the ball bearings 46. This structure was then carefully inserted into a sleeve 48, 50, which applied pressure onto load bearing plate 44 to maintain ball bearings 46 in ball retainer segment 54. Each structure needed to be carefully assembled and inserted into the sleeve 48, 50. Should one structure move during assembly, the ball bearings 46 often spilled out of the structure, thus having to be completely removed and reassembled. This assembly process was both time-consuming and expensive. In addition, this structure required all of the components shown in FIG. 1 to operate properly.

The present disclosure describes improvements on these prior art systems.

SUMMARY OF THE INVENTION

Disclosed is a linear motion bearing assembly having modular bearing segments. The assembly can include at least one modular bearing segment having a first end and a second end, which can include a retainer defining at least one bearing track and defining an open load bearing portion; a plurality of bearings positioned within the bearing track; a bearing plate defining at least one bearing track in communication with less than all of the plurality of bearings and positioned opposite the retainer; and a lid positioned on the bearing plate, fixed to the retainer; at least two end caps, each end cap comprising an arcuate outer portion and a bearing segment retaining structure substantially perpendicular to the arcuate outer portion, extending inward from the arcuate outer portion and connectable with either the first end or the second end of the modular bearing segment; wherein when the end caps are connected to opposing ends of the modular bearing segment, the arcuate outer portion of opposing end caps defines a space between the end caps configured to permit the rocket element to project through the space.

Also disclosed is a modular bearing segment having a first end and a second end. The modular bearing segment assembly can include a retainer defining at least one bearing track having an open load bearing portion; a plurality of bearings positioned within the at least one bearing track; a bearing plate in load bearing communication with less than all of the plurality of bearings and positioned opposite the retainer; and a lid positioned on the bearing plate, fixed to the retainer and defining a rocker element retaining hole positioned above the bearing plate.

Yet further disclosed is a linear motion bearing assembly having modular bearing segments. The assembly can include a linear motion bearing assembly, which can include a plurality of modular bearing segments, each modular bearing segment having a first end and a second end, which can include a retainer defining at least one bearing track and defining an open load bearing portion; a plurality of bearings positioned within the bearing track; a bearing plate defining at least one bearing track in communication with less than all of the plurality of bearings and positioned opposite the retainer, the bearing track including load bearing portions, return portions and turnarounds; a lid positioned on the bearing plate, fixed to the retainer and defining a rocker element retaining hole positioned above the bearing plate; and a rocker element positioned within the rocker element retaining hole and in load bearing communication with the bearing plate; at least two end caps, each end cap comprising an arcuate outer portion and a bearing segment retaining structure substantially perpendicular to the arcuate outer portion, extending inward from the arcuate outer portion and connectable with either the first end or the second end of the modular bearing segment; and at least two end rings configured to mate with an end cap and prevent removal of the bearing segment, wherein when the end caps are connected to opposing ends of the modular bearing segment, the arcuate outer portion of opposing end caps defines a space between the end caps configured to permit the rocket element to project through the space.

BRIEF DESCRIPTION OF THE DRAWINGS

The drawings constitute a part of the specification and include exemplary embodiments of the present invention and illustrate various objects and features thereof.

FIG. 29A is a plan view of modular bearing segments of a linear motion bearing assembly according to the present disclosure;

FIG. 29B is a perspective view of modular bearing segments of a linear motion bearing assembly according to the present disclosure; and FIG. 29C is an end view of modular bearing segments of a linear motion bearing assembly according to the present disclosure.

Like reference numerals indicate similar parts throughout the figures.

DETAILED DESCRIPTION OF THE PREFERRED EMBODIMENT(S)

Figure 1:
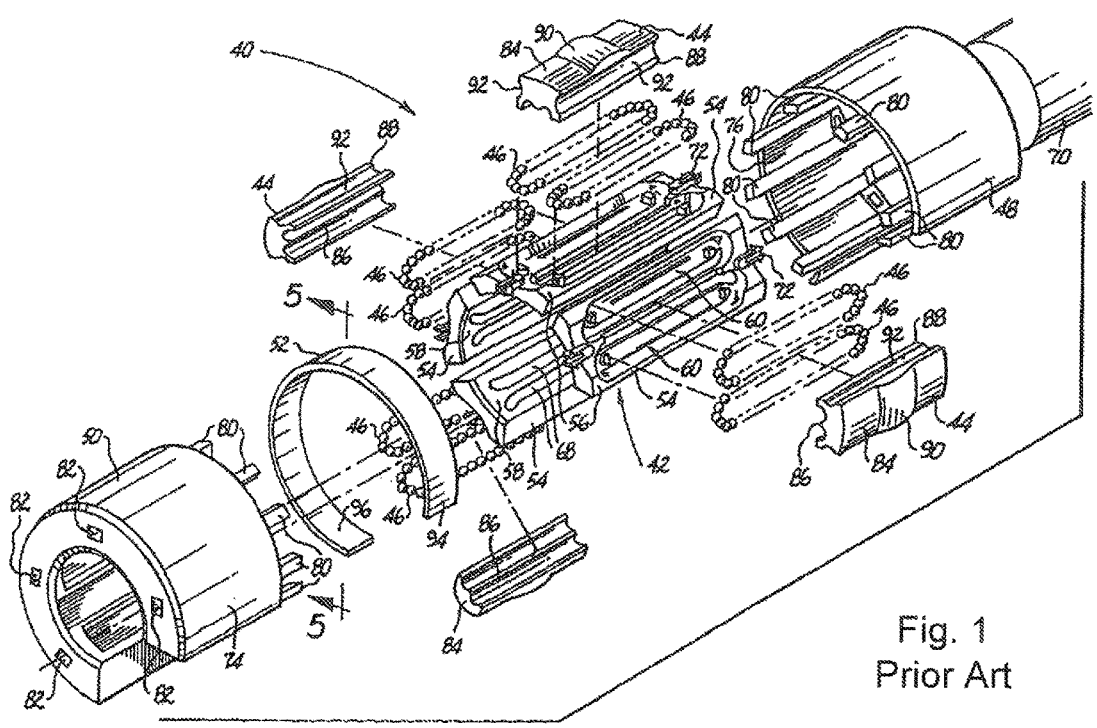
FIG. 1 is an exploded perspective view of a prior art linear motion bearing assembly.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Reference will now be made in detail to the exemplary embodiments of the present disclosure, which are illustrated in the accompanying figures.

The present disclosure solves the problems in the prior art by providing of a linear motion bearing assembly with modular bearing segments. The linear motion bearing assembly with modular bearing segments greatly improves on the prior art.

Figure 3:
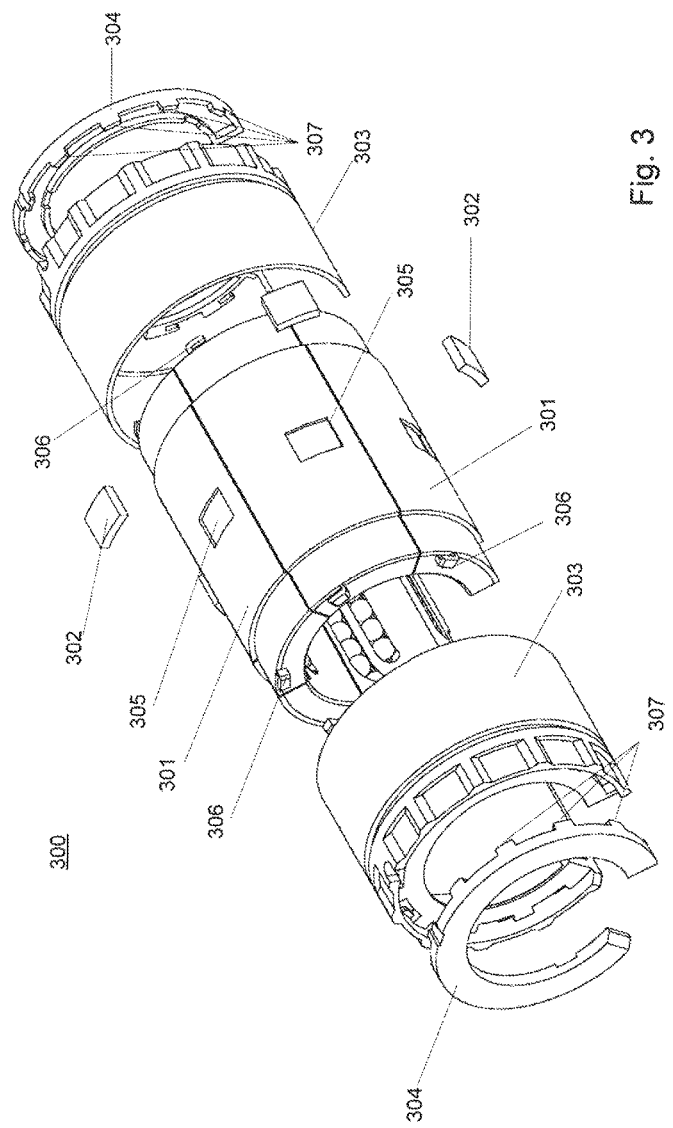
FIG. 3 is an exploded perspective view of a linear motion bearing assembly with modular bearing segments according to the present disclosure.
Figure 4:
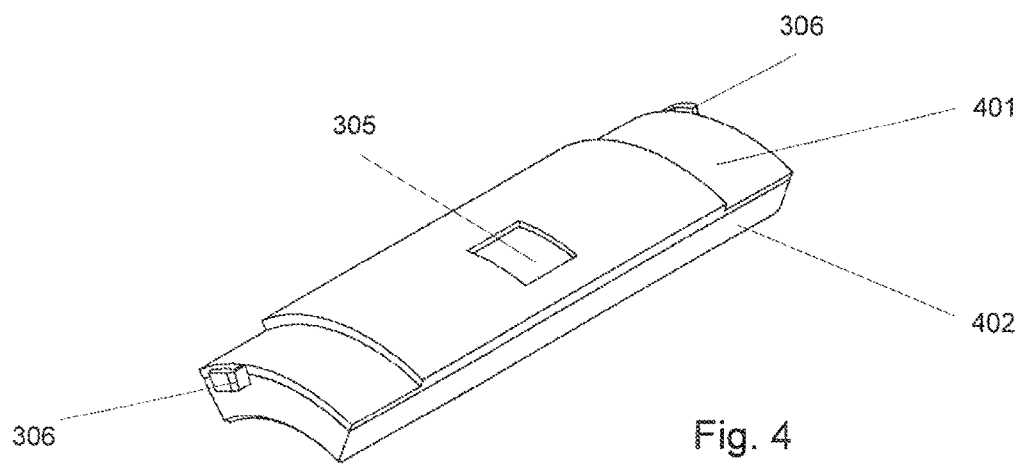
FIG. 4 is a perspective view of a modular bearing segment according to the present disclosure.
Figure 5:
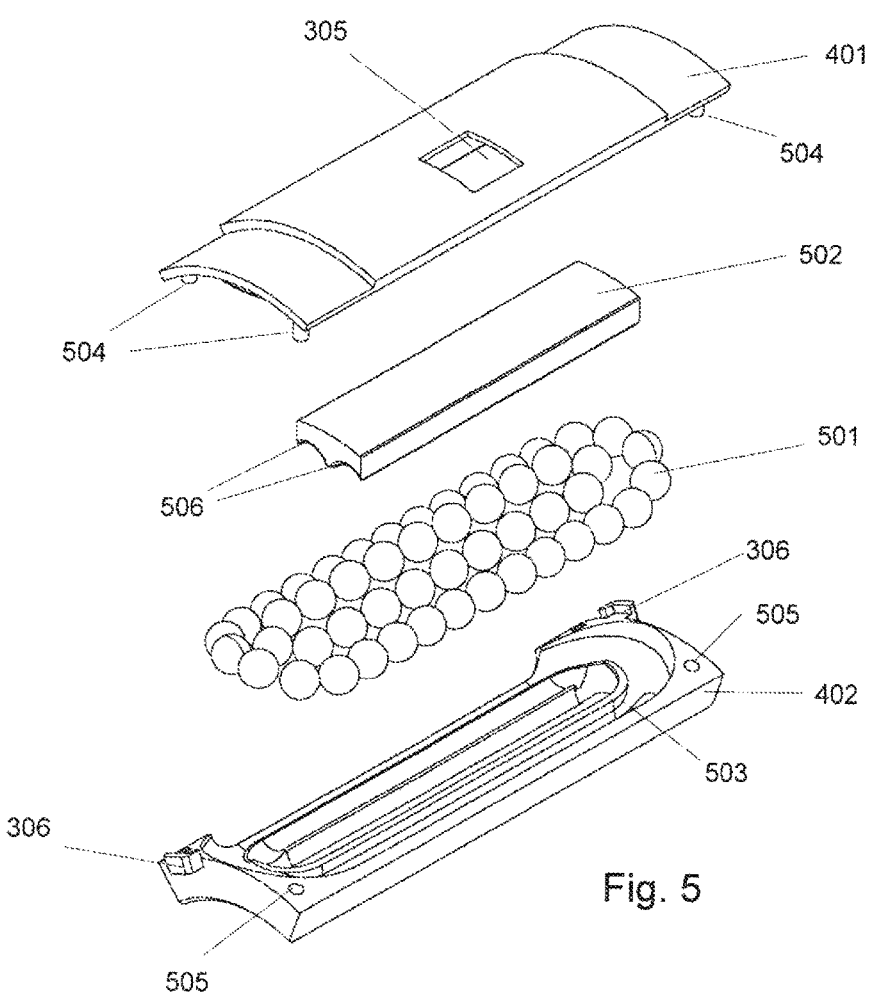
FIG. 5 is an exploded perspective view of a modular bearing segment according to the present disclosure.
Figure 6:
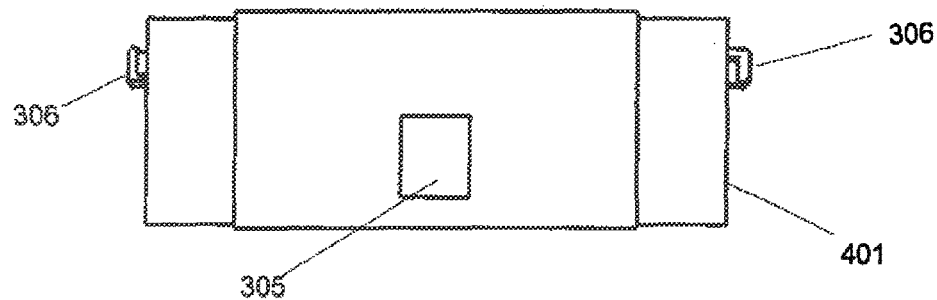
FIG. 6 is a top plan view of a modular bearing segment according to the present disclosure.
Figure 7:
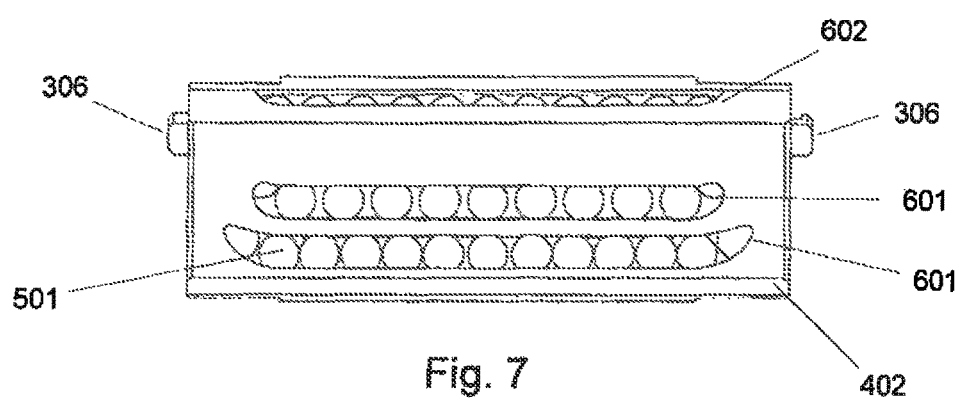
FIG. 7 is a bottom plan view of a modular bearing segment according to the present disclosure.
Figure 8:
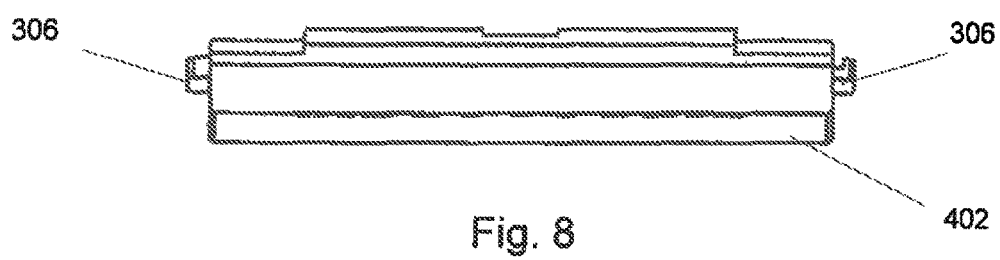
FIG. 8 is a side plan view of a modular bearing segment according to the present disclosure.
Figure 9:
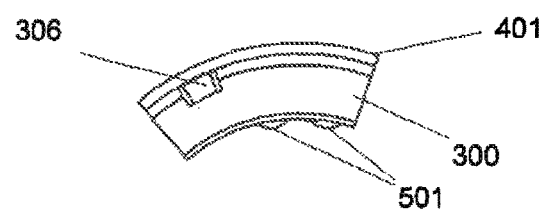
FIG. 9 is an end plan view of a modular bearing segment according to the present disclosure.
Figure 10:
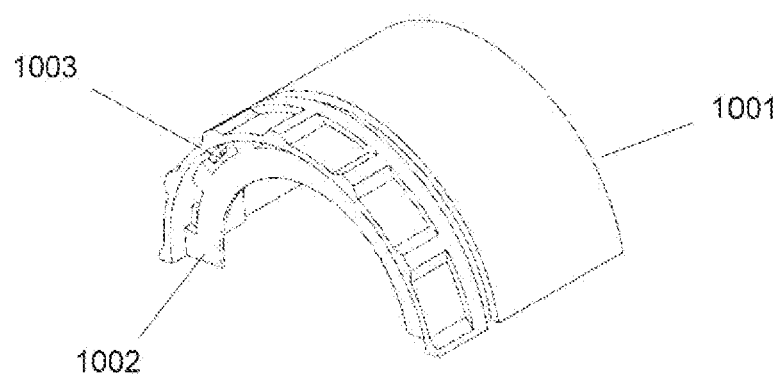
FIG. 10 is a perspective view of an end cap according to the present disclosure.

FIG. 3 illustrates a linear motion bearing assembly with modular bearing segments according to the present disclosure. The linear motion bearing assembly 300 with modular bearing segments includes at least one modular bearing segment 301, rocker element(s) 302 (also referred to herein and in other applications and in other embodiments and variations as "pieces"), end caps 303 (also referred to herein and in other applications and in other embodiments and variations as "sleeves") and end rings 304. The embodiment illustrated in FIG. 3 includes five (5) bearing segments 301, but as will be seen, varying numbers and orientation of bearing segments 301 can be utilized. The number and configurations of the bearing segments 301 will depend on the load bearing requirements of the linear bearing assembly 300, and can be varied accordingly; and Each bearing segment 301 also defines a rocker element retaining hole 305 for accepting a rocker element 302 therein. In a preferred embodiment, rocker element retaining hole 305 is positioned offset from a longitudinal axis of a bearing segment 301, particularly lid 401. Rocker element 302 transfers the load from inside bearing segment 301 to an external housing. Examples of such housings are disclosed in U.S. application Ser. No. 13/814,830, filed Apr. 12, 2013, entitled "Clam Shell Linear Motion Bearing Assembly", the entire contents of which is incorporated herein by reference. In addition, each bearing segment 301 includes end cap connecting structures 306 positioned at each end of bearing segment 301. End rings 304 each include a plurality of locking protrusions 307 extending substantially perpendicular from and inner surface of end rings 304.

Modular bearing segment 301 will now be described in more detail with reference to FIGS. 4-9.

Each modular bearing segment 301 includes a retainer 402 defining at least one bearing track 503. Retainer 402 has an arcuate configuration designed to substantially mate with an inner race or rail (see, FIG. 13, inner race 1301). Bearing track(s) 503 are designed to receive bearings 501 therein. The orientation of the bearing tracks 503 are designed to enhance load capacity and maximize space for a more compact and efficient bearing arrangement. Examples of various track designs are disclosed in U.S. application Ser. No. 13/810,264, filed Apr. 5, 2013, entitled "Linear Bearing with Nested Tracks", the entire contents of which is incorporated herein by reference. Bearing tracks 503 can include load bearing portions, return portions and turnarounds.

Bearing tracks 503 define open load bearing portions 601 designed to permit a portion of each bearing 501 exposed thereto to extend through (see, FIG. 9) open load bearing portions 601, such that bearings 501 can potentially communicate with inner race 1301 when linear bearing assembly 300 is utilized. Inner race 1301 is illustrated as a substantially cylindrical shaft, but other configurations may also be used, for example, shafts disclosed in U.S. application Ser. No. 13/812,5038, filed Apr. 5, 2013, entitled "Linear Motion Bearing System with Self-Aligning Rail", the entire contents of which is incorporated herein by reference. Open load bearing portions 601 permit bearings 501 in communication with inner race 1301 to transfer a load from bearings 501 to inner race 1301.

Also defined in retainer 402 is a longitudinal groove 602. These grooves 602 make up a side wall of the axial ball tracks 503 and guide bearings 501 as they move through the return portion thereof.

Each modular bearing segment 301 further includes a bearing plate 502. Bearing plate 502 includes bearing tracks 506 defined on a surface configured to communicate with bearings 501. Bearing plate 502 rests on bearings 501 and transfers a load from bearing plate 502 onto bearings 501 in communication therewith, which in turn transfers the load to inner race 1301.

One difference between prior art designs and the modular bearing segment 301 according to the present disclosure is that modular bearing segment 301 also includes a lid 401. Lid 401 is attached to retainer 402 to encase bearings 501 and bearing plate 502 therein. Once lid 401 is attached to retainer 402 a free-standing modular bearing segment 301 is provided. Aligning and attaching lid 401 to retainer 402 can be accomplished through the use of protrusions 504 and holes 505 and adhesives, although other structures and methods for aligning and attaching lid 401 to retainer 402 are contemplated.

Lid 401 defines rocker element retaining hole 305 therein. Rocker element retaining hole 305 is positioned such that when lid 401 is attached to retainer 402 a portion of bearing plate 502 is exposed through rocker element retaining hole 305. Rocker element retaining hole 305 is configured to accept a rocker element 302 therein. When assembled, a load on rocker element 302 is transferred from rocker element 302 to bearing plate 502 to bearings 501 to inner race 1301. Rocker element 302 is shaped to provide some rocking movement with bearing plate 502 at the point of contact there-between, for example, rocker element 302 can have a shape shown in FIG. 21.

Figure 26:
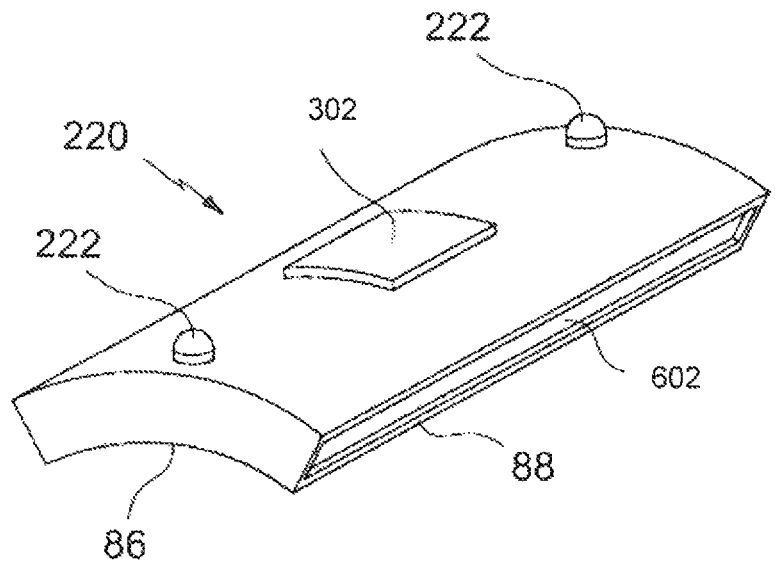
FIG. 26 is a perspective view of a modular bearing segment of a linear motion bearing assembly according to the present disclosure.
Figure 27:
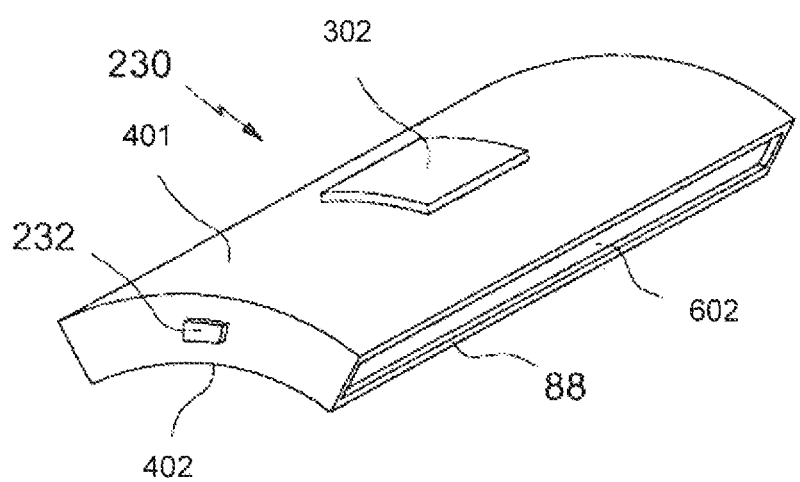
FIG. 27 is a perspective view of a modular bearing segment of a linear motion bearing assembly according to the present disclosure.
Figure 28C:
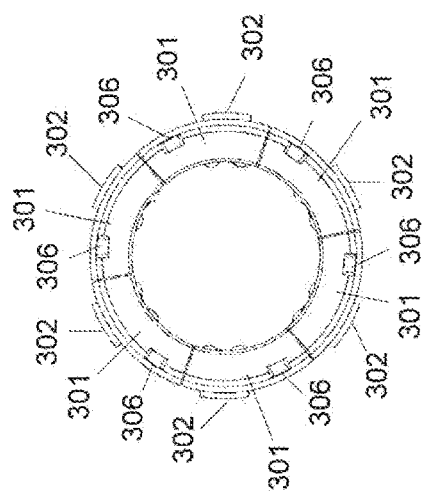
FIG. 28C is an end view of modular bearing segments of a linear motion bearing assembly according to the present disclosure.
Figure 28B:
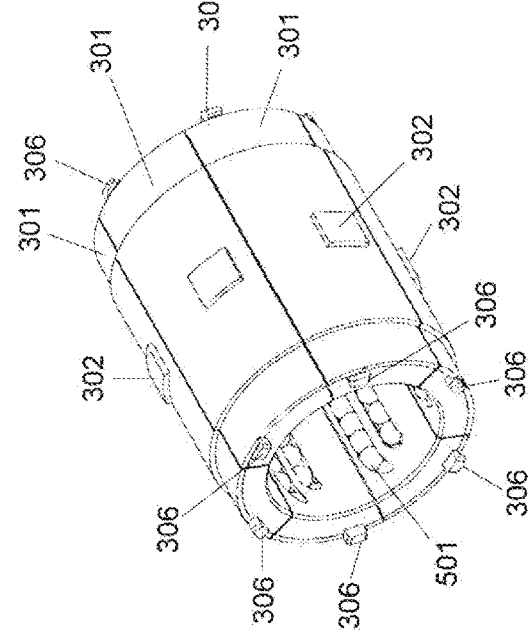
FIG. 28B is a perspective view of modular bearing segments of a linear motion bearing assembly according to the present disclosure.
Figure 28A:
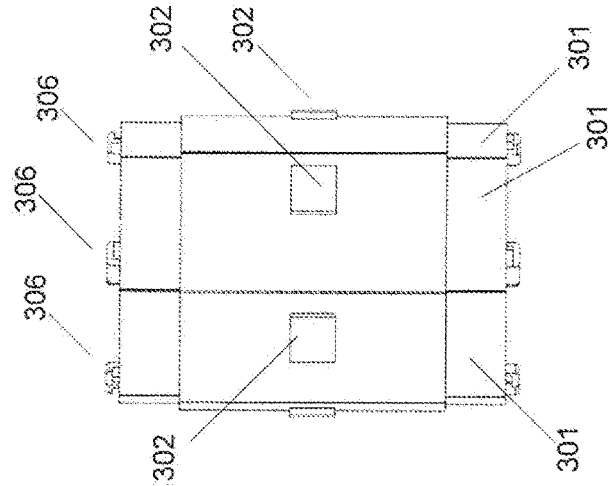
FIG. 28A is a plan view of modular bearing segments of a linear motion bearing assembly according to the present disclosure.

Additional embodiments of modular bearing segments are illustrated in FIGS. 26 and 27.

FIG. 26 shows an example of modular bearing segment 220 which could be used in accordance with an embodiment of the disclosure. Modular bearing segment 220 may be elongated along the longitudinal axis of the bearing assembly and include an outer radial surface 84, an inner radial surface 86, and a pair of side wall surfaces 88. A longitudinal groove 602 may be formed in each side wall surface 88 of modular bearing segment 220. A recess or protuberance 222 may be disposed on outer radial surface 84 of modular bearing segment 220 and may be used to mate with recess or protuberance 212 on sleeve 210.

FIG. 27 shows an example of another modular bearing segment 230 which could be used in accordance with an embodiment of the disclosure. Modular bearing segment 230 may be elongated along the longitudinal axis of the bearing assembly and include an outer radial surface 84, an inner radial surface 86, and a pair of side wall surfaces 88. A longitudinal groove 602 may be formed in each side wall surface 88 of modular bearing segment 220. A recess or protuberance 232 may be disposed on an axial end of modular bearing segment 230 and may be used to mate with recess or protuberance 272 on sleeve 210.

End caps 303 will now be described with respect to FIGS. 10-15. End caps 303 include an arcuate outer portion 1001, a bearing segment retaining structure 1002 extending inward from and substantially perpendicular to the arcuate outer portion 1001, and at least one bearing segment connecting structure 1003 positioned along the inner surface of the arcuate outer portion 1001 and at slots defined in bearing segment retaining structure 1002. The arcuate shape of the arcuate outer portion 1001 is substantially similar to the arcuate shape of lid 401 of bearing segment 301. Bearing segment connecting structure 1003 is configured to mate with end cap connecting structure 306 and lock together in a sliding manner.

End cap 303 is shown in various configurations throughout the drawings. In FIG. 3, end cap 303 is configured as almost a complete ring with only a portion of the ring removed, whereas in FIG. 10 end cap 303 is configured as a semicircle. Other variations are contemplated, for example end cap 303 can be configured as a complete ring. Generally speaking though, end cap 303 is designed to fit a predetermined number of bearing segments 301 therein. So for example, in FIG. 3, end cap 303 has an arc length substantially equal to an arc length of 5 bearing segments, whereas in FIG. 14 end cap 303 has an arc length substantially equal to an arc length of 3 bearing segments 301. Thus, by changing the end cap 303 configuration different load bearing configurations can be obtained. For example, a configuration shown in FIG. 3 requires bearing assembly 300 to be slid over an inner race 1303, whereas a configuration shown in FIGS. 17 and 18 can enable bearing assembly 300 to be clamped around inner race 1301.

Figure 11:
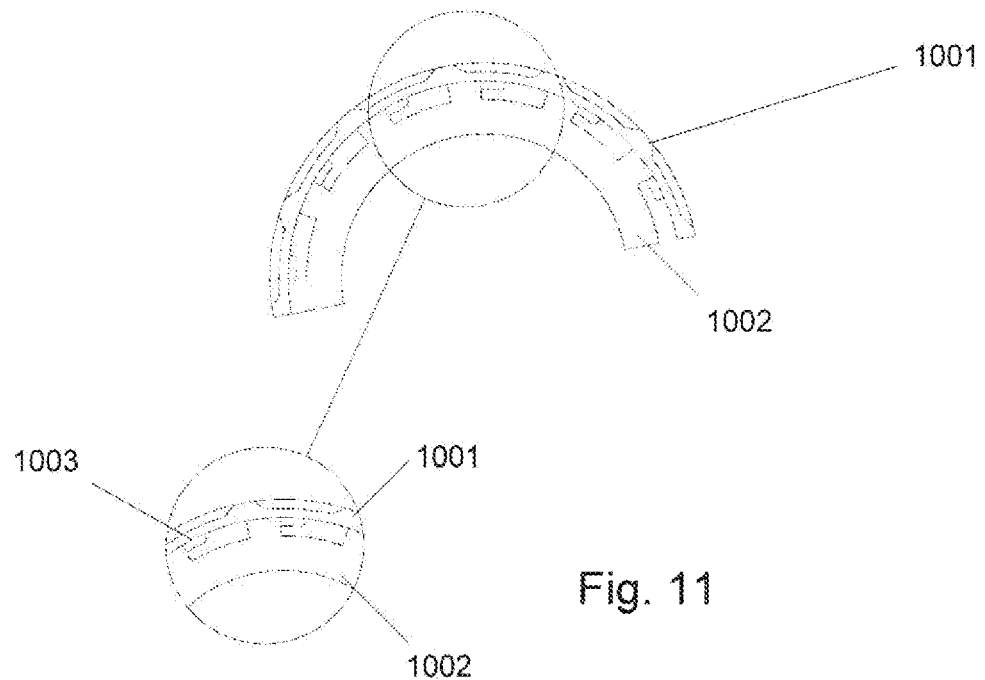
FIG. 11 is an end view of an end cap according to the present disclosure.
Figure 12:
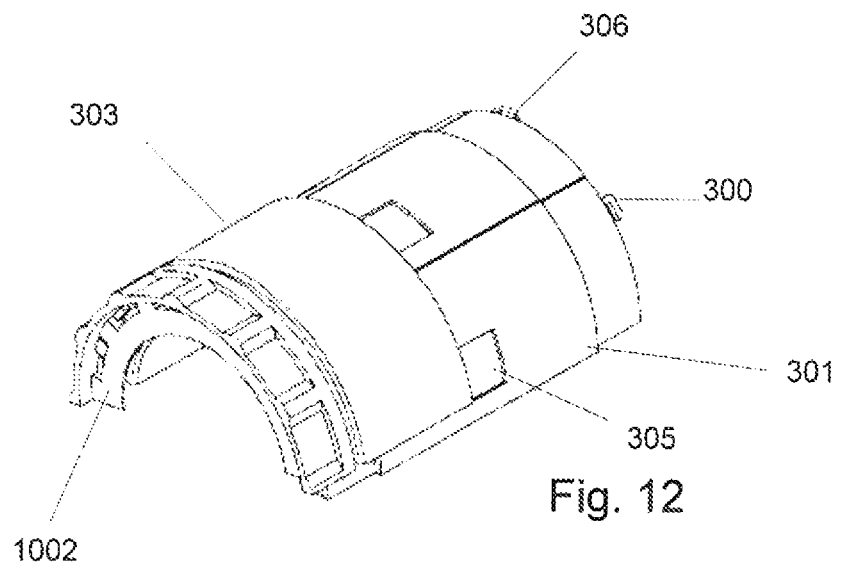
FIG. 12 is a perspective view of an end cap assembled with modular bearing segments in an unlocked position according to the present disclosure.

In a preferred embodiment, there are a plurality of bearing segment connecting structures 1003 positioned about bearing segment retaining structure 1002 as shown in FIG. 11, such that a plurality of bearing segments 301 can be attached to each end cap 303 (see, e.g., FIGS. 3 and 12).

Further, as illustrated in FIGS. 28A-29C, the position of the bearing segment connecting structures 1003 and the positions of the end cap connecting structures 306 are such that by rotating a bearing segment 301 either end cap connecting structure 306 of a bearing segment 301 can connect with an end cap 303 and still provide a tight fit between adjacent bearing segments 301. The ability to rotate a bearing segment 301 permits a rocker element 302 and underlying bearings 501 to be positioned at a second location to permit variations in load bearing configurations.

Figure 13:
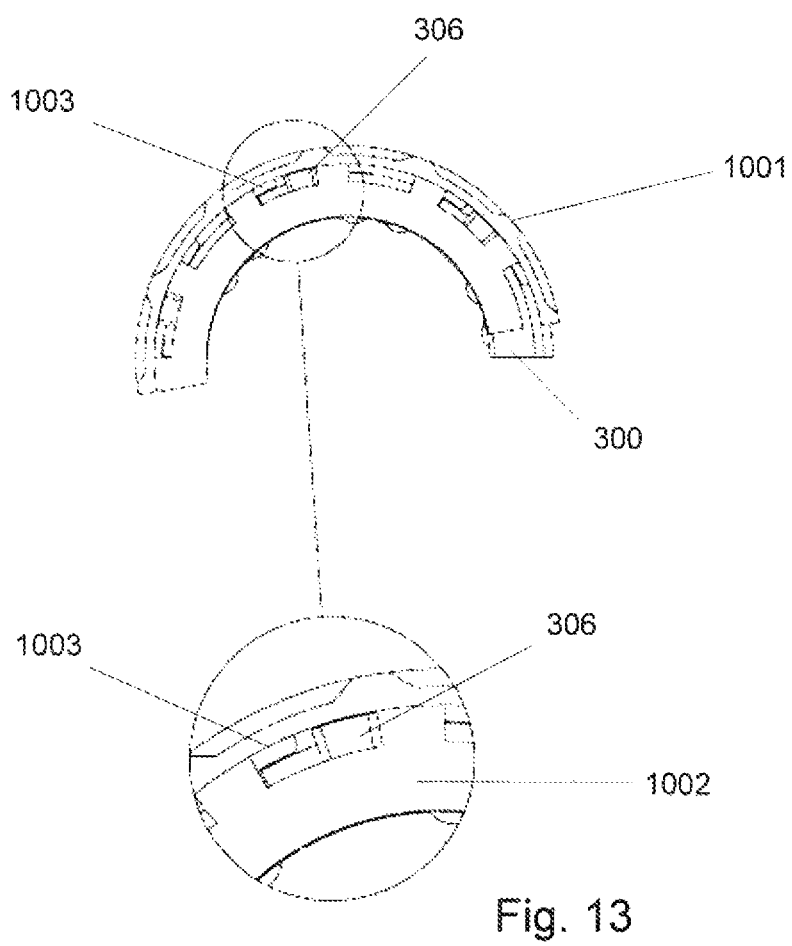
FIG. 13 is an end view of an end cap assembled with modular bearing segments in an unlocked position according to the present disclosure.
Figure 14:
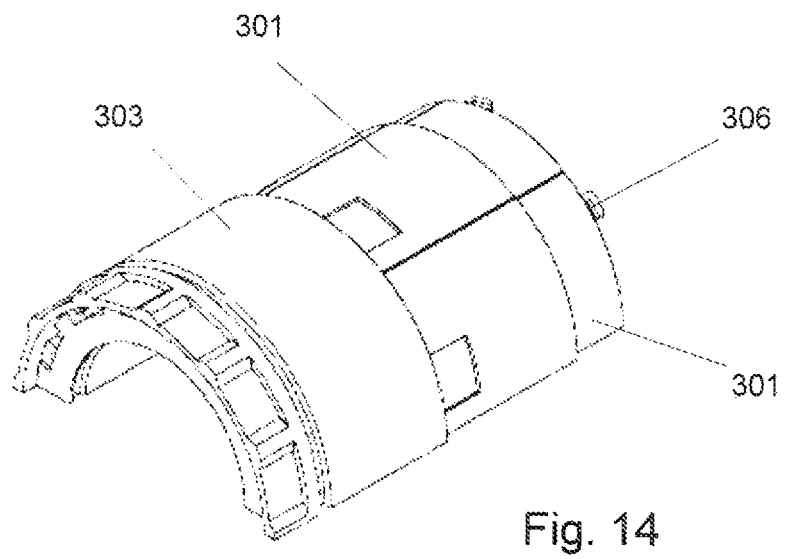
FIG. 14 is a perspective view of an end cap assembled with modular bearing segments in a locked position according to the present disclosure.
Figure 15:
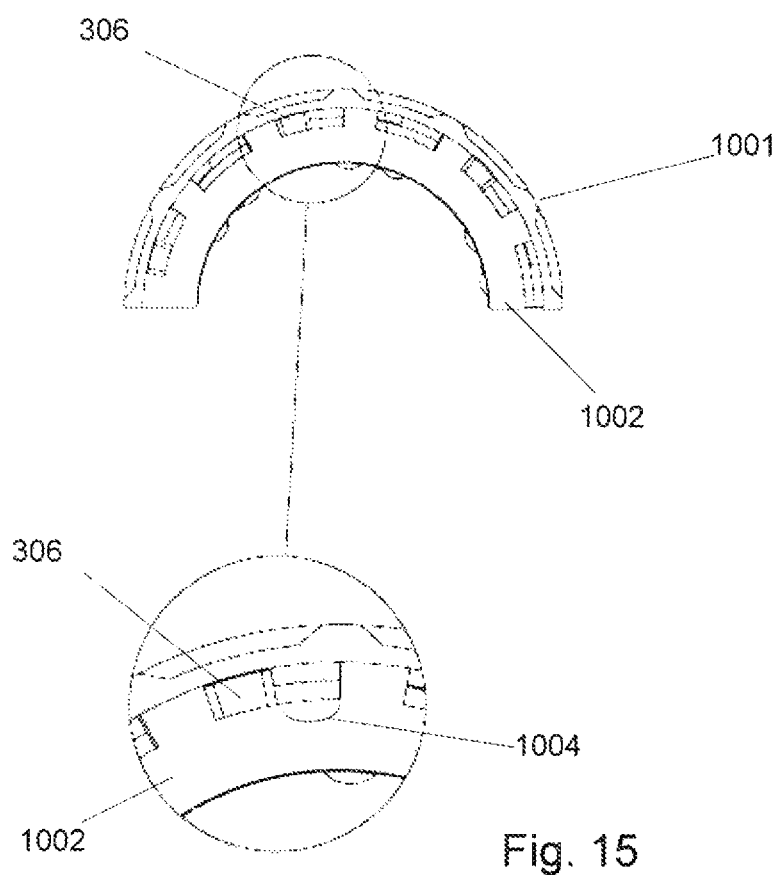
FIG. 15 is an end view of an end cap assembled with modular bearing segments in a locked position according to the present disclosure.

As shown in FIGS. 12 and 13, end cap connecting structure 306 fits into one of the slots defined in bearing segment retaining structure 1002. End cap 303 is then rotated as shown by the arrow in FIGS. 14 and 15, which in turn engages end cap connecting structure 306 with bearing segment connecting structure 1003 thus locking end cap 303 onto bearing segment 301. In a similar manner, a second end cap 303 is positioned on bearing segments 301 and by twisting, is locked into engagement therewith (see, e.g., FIGS. 3 and 16). When locked into position, a space 1004 is created between end cap connecting structure 306 and bearing segment retaining structure 1002 (see, e.g., FIG. 15).

Figure 16:
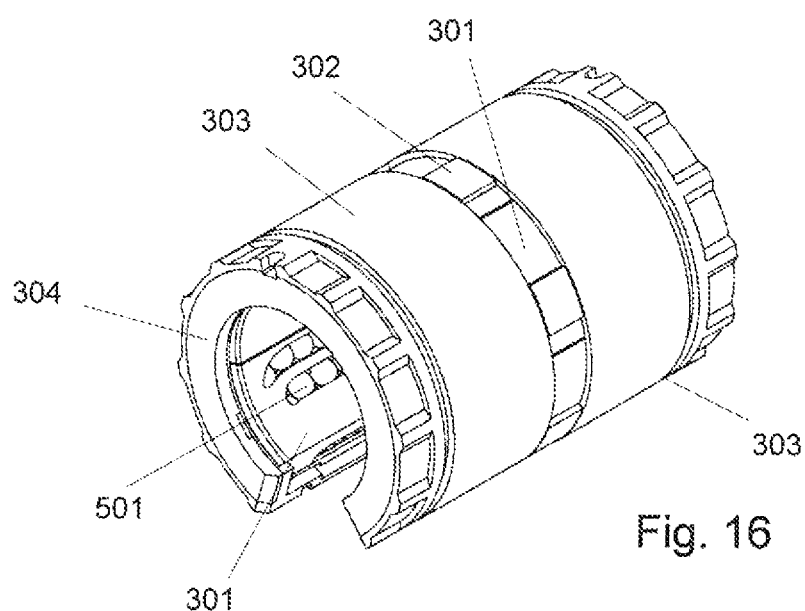
FIG. 16 is a perspective view of an assembled linear motion bearing assembly according to the present disclosure.
Figure 17:
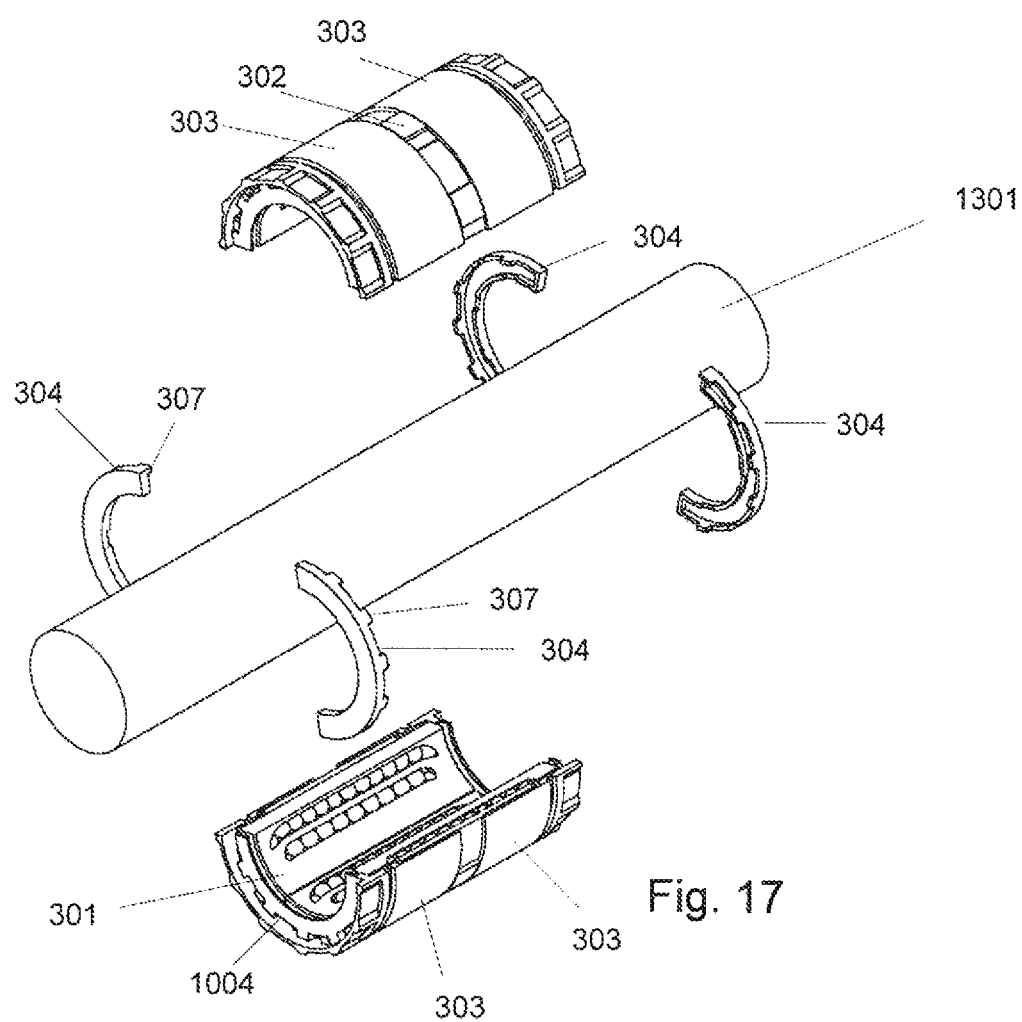
FIG. 17 is a perspective view of a partially assembled linear motion bearing assembly and an inner race according to the present disclosure.
Figure 18:
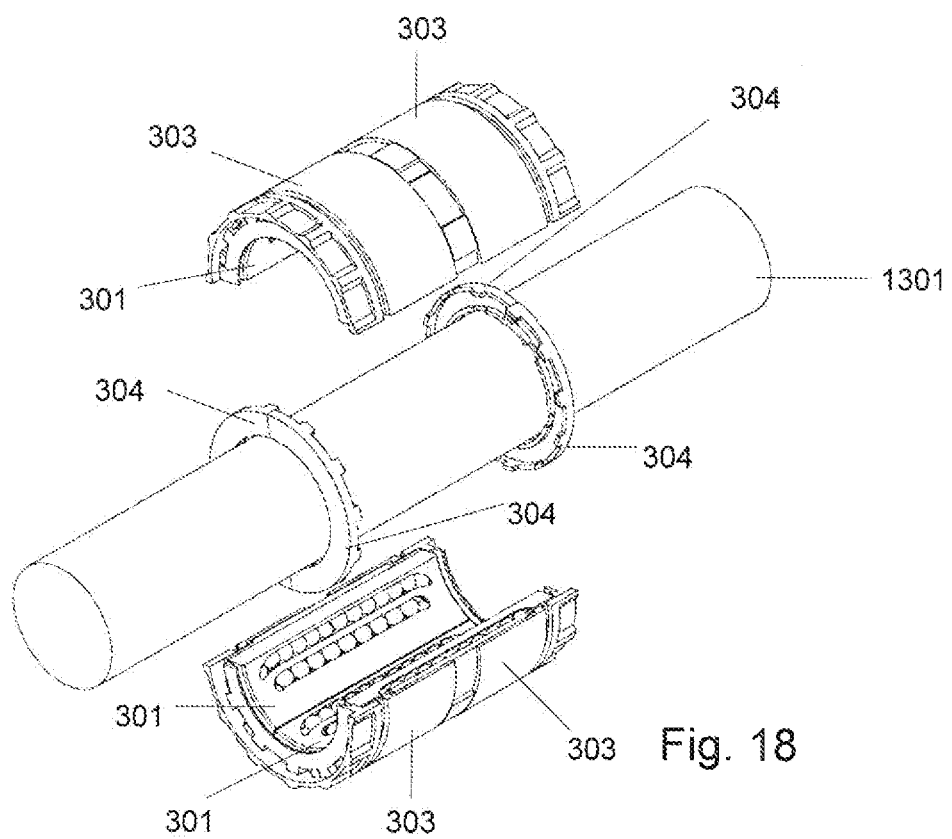
FIG. 18 is a perspective view of a partially assembled linear motion bearing assembly and an inner race according to the present disclosure.
Figure 19:
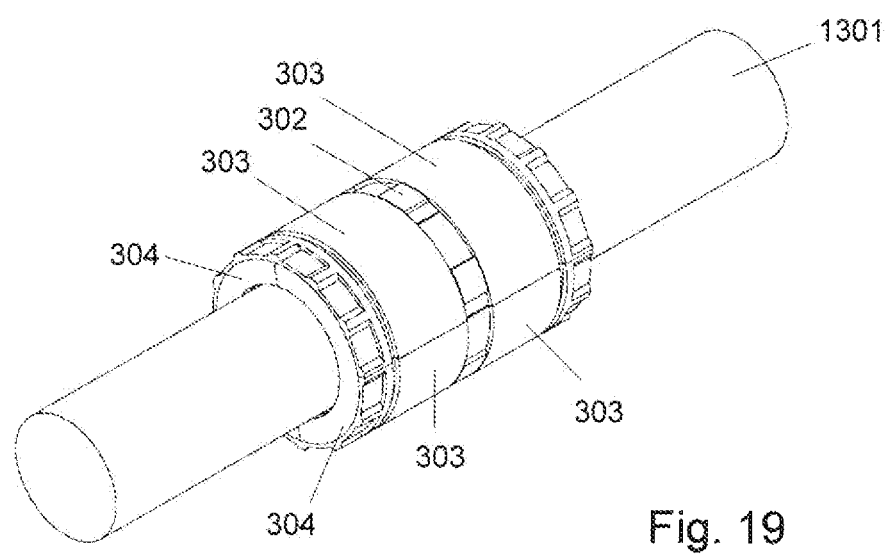
FIG. 19 is a perspective view of an assembled linear motion bearing assembly and an inner race according to the present disclosure.

FIG. 16 illustrates a complete bearing assembly 300 with an end ring 304 attached to each end cap 303. When the 2 end caps 303 are fully engaged with bearing segments 301, a space is defined between opposing ends of end caps 303. This space is at least as wide at a rocker element 302 to permit rocker element 302 to pass there through. In one embodiment rocker element 302 extends past the outer surface of end cap 303. End rings 304 can be of various arc lengths, for example, as shown in FIGS. 3 and 17; other lengths are contemplated.

End rings 304 are mounted onto end caps 306 as shown to lock bearing segments 301 in place. This is accomplished by a mating of the locking protrusions 307 with spaces 1004. Locking protrusions 307 are configured to be of a shape and size substantially similar to the shape and size of space 1004. When locking protrusions 307 are inserted into spaces 1004, end cap connecting structures 306 are prevented from sliding back into an unlocked position. As described above, a housing would typically encase bearing assembly 300 in its final deployment.

FIGS. 20-25 illustrate variations of the linear bearing assembly according to the present disclosure.

Figure 20:
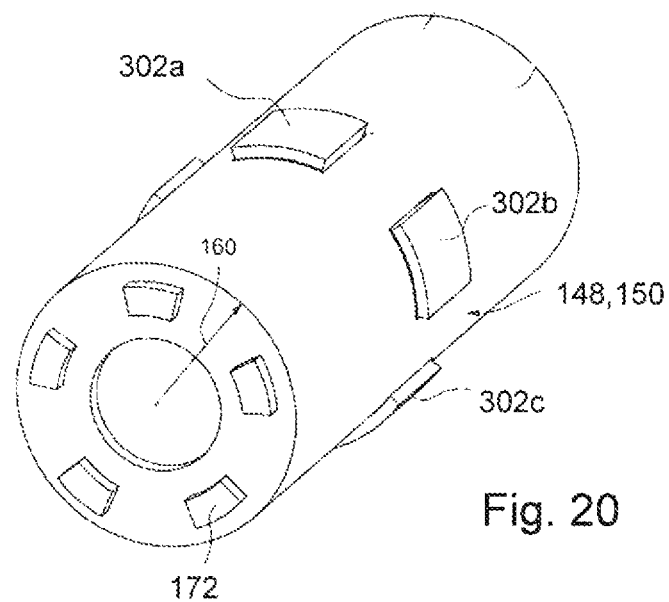
FIG. 20 is a perspective view of a linear motion bearing assembly according to the present disclosure.
Figure 21:
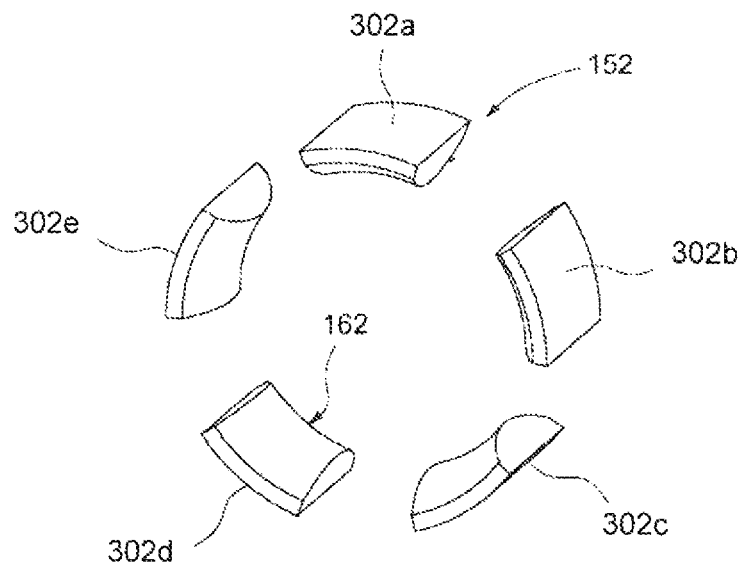
FIG. 21 is an exploded perspective view of a plurality of rocker elements of a linear motion bearing assembly according to the present disclosure.

FIGS. 20 and 21 are perspective view drawings of another bearing assembly according to the present disclosure. Bearing assembly includes multiple rocker elements. Five pieces (i.e. rocker elements) 302a, 302b, 302c, 302d, 302e are shown in FIG. 21 though any number of pieces could be used. Pieces 302 may be cylinders, spheres, flattened cylinders, pyramids, etc. Pieces 302 may be distributed around a circumference of sleeve 148, 150 so that each space between each piece 302 is of the same size. Sleeve 148, 150 may comprise multiple pieces or a single piece.

Each piece 302 has an internal arc with a radius of curvature 162 (FIG. 21) that corresponds to or is slightly larger than a radius of curvature 160 of outer housing sleeve 148, 150. The inventor has discovered that the tolerance accuracy needed to manufacture modular bearing segments is quite high and therefore difficult and expensive to produce. In fact, a high percentage of manufactured pieces may need to be discarded because of the high necessary tolerances. If a bearing segment includes dimensions too far removed from defined tolerances, excess unbalanced pressure may be placed on outer housing sleeve 148, 150 and then on bearings 501.

In contrast, overall tolerance accuracy requirements are lower for bearing assemblies having multiple pieces 302. Each piece 302 requires less tolerance accuracy which results in faster, less expensive manufacturing. Pieces 302 are less sensitive to twisting forces applied to outer housing sleeve 148, 150. Bearing segments are less sensitive to out of "roundness" from each piece 302. Less material is used for bearing segments and more manufacturing methods are available. Powder metal could be used to manufacture pieces 302.

Figure 2:
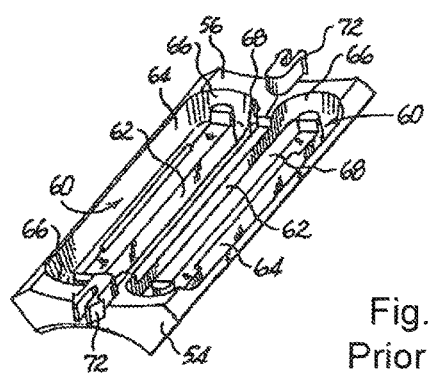
FIG. 2 is a ball retainer structure of the linear motion bearing assembly of FIG. 1.
Figure 22:
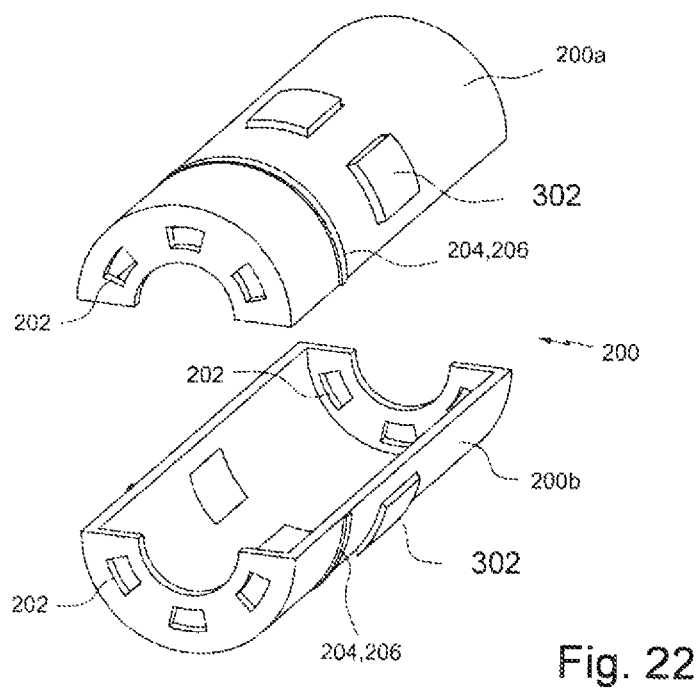
FIG. 22 is a front perspective view of a caps of a linear motion bearing assembly according to the present disclosure.

Referring to FIG. 22, there is shown another sleeve 200 which could be used in accordance with an embodiment of this disclosure. Unlike sleeve 148, 150 discussed above, sleeve 200 is split in half axially defining a top part 200a and a bottom part 200b. Top and bottom parts 200a, 200b may be identical and each forms a hollow half cylinder. Pieces 302 may be disposed in top and bottom parts 200a, 200b as discussed above. Walls defining openings 202 may be disposed at distal ends of sleeve 200 to mate with clips 172 of a bearing segment discussed above (see FIG. 2, element 72).

In order to assemble a linear bearing assembly using sleeve 200, top part 200a may be placed on top of bottom part 200b. Top and bottom parts 200a, 200b may be strapped together with a strap or clip 204. A recess 206 may be disposed circumferentially around sleeve 200 to receive strap or clip 204.

Sleeve 200 provides benefits not available in the prior art. For example, sleeve 200 may benefit from lower accuracy requirements during manufacture. Less accuracy requirements result in faster, less expensive manufacturing. Less tolerance for errors in size and shape is required for each part 200a, 200b. Further, as top and bottom parts 200a, 200b may be identical, only a single type of piece needs to be manufactured. This results in a simplified manufacturing process. Sleeve 200 can handle higher loads in the axial direction than the prior art structures resulting in higher axial strength.

Figure 23:
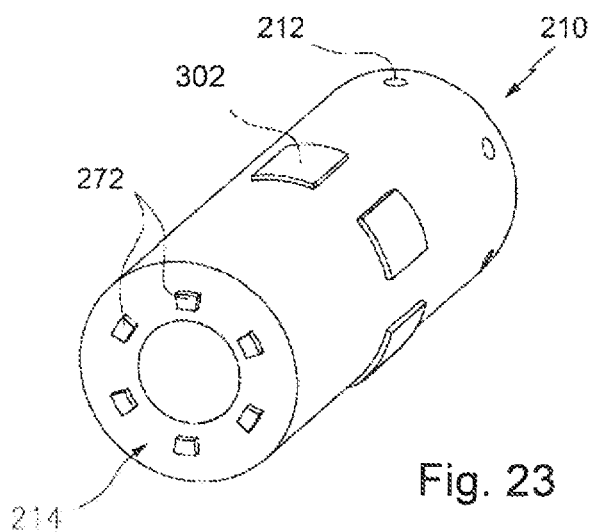
FIG. 23 is a front perspective view of a linear motion bearing assembly according to the present disclosure.
Figure 24:
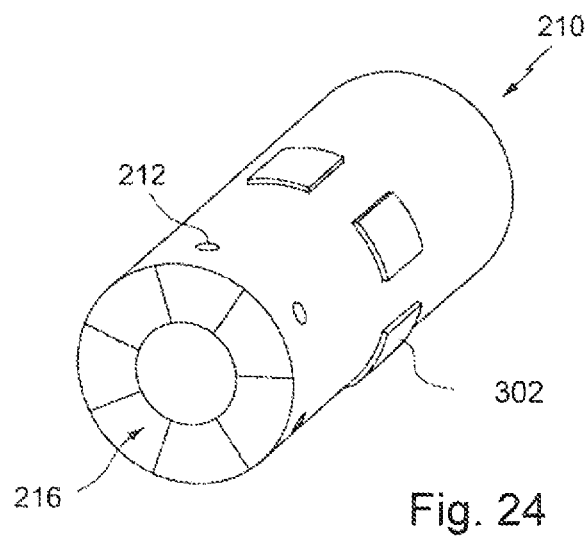
FIG. 24 is a rear perspective view of a linear motion bearing assembly according to the present disclosure.

FIGS. 23 and 24 show another sleeve 210 that could be used in accordance with an embodiment of the disclosure. FIG. 23 shows a front 214 of sleeve 210 and FIG. 24 shows a rear 216 of sleeve 210. Sleeve 210 is a single monolithic structure so that no assembly of sleeve 210 is required. Sleeve 210 may further include pieces 302. Mating recesses and/or protuberances 212, 272 may be disposed on sleeve 210 to mate with bearing segments as discussed below.

Figure 25:
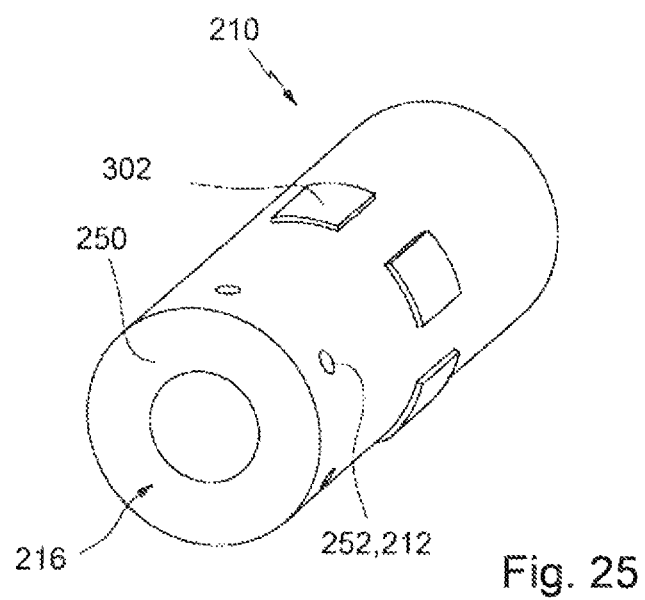
FIG. 25 is a perspective view of a linear motion bearing assembly according to the present disclosure.

To assemble a linear bearing assembly including sleeve 210, again as sleeve 210 is a monolithic structure, no assembly of sleeve 210 is needed. Bearing segment 301 may be inserted into rear 216 of sleeve 210. Each bearing segment 220 may mate with sleeve 210 by pushing bearing segment 220 radially outward so that recess/protuberance 222 of bearing segment 220 mates with recess/protuberance 212 of sleeve 210. Similarly, each bearing segment 230 may mate with sleeve 210 by pushing bearing segment 220 axially so that recess/protuberance 232 of bearing segment 230 mates with recess/protuberance 272 of sleeve 210. A plurality of bearing segments 220, 230 perhaps of differing configurations may be used in a single sleeve 210. Alternatively, as shown in FIG. 25, a single monolithic bearing segment 250 may be placed inside sleeve 210. Bearing segment 250 may similarly include a recess or protuberance 252 that can mate with recess/protuberance 212.

A linear bearing assembly with modular bearing segments provides significantly greater structural integrity than that available in the prior art. The modular nature of the linear bearing assembly with modular bearing segments simplifies the assembly process. In addition, the modular nature of the linear bearing assembly with modular bearing segments is easily configurable for varying load requirements.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A linear motion bearing assembly, comprising:
at least one modular bearing segment having a first end and a second end, comprising:
a retainer defining at least one bearing track and defining an open load bearing portion;
a plurality of bearings positioned within the bearing track;
a bearing plate defining at least one bearing track in communication with less than all of the plurality of bearings and positioned opposite the retainer;
a lid positioned on the bearing plate, fixed to the retainer; and
at least two end caps, each end cap comprising an arcuate outer portion and a bearing segment retaining structure substantially perpendicular to the arcuate outer portion, extending inward from the arcuate outer portion and connectable with either the first end or the second end of the modular bearing segment;
wherein when the end caps are connected to opposing ends of the modular bearing segment, the arcuate outer portion of opposing end caps defines a space between the end caps configured to permit a rocker element to project through the space.

2. The linear bearing assembly of claim 1, wherein
the bearing segment further comprises a first end cap connecting structure positioned at the first end of the bearing segment and a second end cap connecting structure positioned at the second end of the bearing segment,
the end caps each comprise a plurality of bearing segment connecting structures positioned radially on the bearing segment retaining structure, and
an end cap connecting structure removably interlocks with a bearing segment connecting structure.

3. The linear bearing assembly of claim 2, further comprising at least two end rings, each configured to mate with a respective one of said end caps.

4. The linear bearing assembly of claim 2, wherein the first end cap connecting structure and the second end cap connecting structure are connectable with any of the bearing segment connecting structures.

5. The linear bearing assembly of claim 2, wherein each said end cap has an arc length measured perpendicular to a longitudinal axis of the end cap and the bearing segment has an arc length measured perpendicular to a longitudinal axis the bearing segment, and
the arc length of each said end cap is substantially equal to the arc length of at least one bearing segment.

6. The linear bearing assembly of claim 2, further comprising a plurality of bearing segments positioned adjacent each other and interlocked in the end caps.

7. The linear bearing assembly of claim 6, wherein each said end cap has an arc length measured perpendicular to a longitudinal axis of the respective end cap and the bearing segment has an arc length measured perpendicular to a longitudinal axis the bearing segment, and
the arc length of each said end cap is substantially equal to the sum of the arc lengths of the plurality of adjacent bearing segments.

8. The linear bearing assembly of claim 1, wherein the lid defines a rocker element retaining hole positioned above the bearing plate, the bearing segment further comprising the rocker element positioned within the rocker element retaining hole and in load bearing communication with the bearing plate.

9. The linear bearing assembly of claim 8, further comprising a housing positioned about the bearing segments and said at least two end caps.

10. The linear bearing assembly of claim 1, wherein a rocker element retaining hole is positioned offset from a longitudinal axis of the lid.

11. The linear bearing assembly of claim 1, wherein the bearing track includes load bearing portions, return portions and turnarounds.

12. A modular bearing segment having a first end and a second end, comprising:
a retainer defining at least one bearing track having an open load bearing portion;
a plurality of bearings positioned within the at least one bearing track;
a bearing plate in load bearing communication with less than all of the plurality of bearings and positioned opposite the retainer; and
a lid positioned on the bearing plate, fixed to the retainer and defining a rocker element retaining hole positioned above the bearing plate.

13. The modular bearing segment of claim 12, further comprising a rocker element positioned within the rocker element retaining hole and in load bearing communication with the bearing plate.

14. The modular bearing segment of claim 12, further comprising a first end cap connecting structure positioned at the first end of the bearing segment and a second end cap connecting structure positioned at the second end of the bearing segment.

15. The modular bearing segment of claim 12, wherein the rocker element retaining hole is positioned offset from a longitudinal axis of the lid.

16. The modular bearing segment of claim 12, wherein the bearing track includes load bearing portions, return portions and turnarounds.

17. A linear motion bearing assembly, comprising:
a plurality of modular bearing segments, each modular bearing segment having a first end and a second end, comprising:
a retainer defining at least one bearing track and defining an open load bearing portion;
a plurality of bearings positioned within the bearing track;

a bearing plate defining at least one bearing track in communication with less than all of the plurality of bearings and positioned opposite the retainer, the bearing track including load bearing portions, return portions and turnarounds;

a lid positioned on the bearing plate, fixed to the retainer and defining a rocker element retaining hole positioned above the bearing plate;

a rocker element positioned within the rocker element retaining hole and in load bearing communication with the bearing plate;

at least two end caps, each end cap comprising an arcuate outer portion and a bearing segment retaining structure substantially perpendicular to the arcuate outer portion, extending inward from the arcuate outer portion and connectable with either the first end or the second end of the modular bearing segment; and at least two end rings configured to mate with an end cap and prevent removal of the bearing segment, wherein when the end caps are connected to opposing ends of the modular bearing segment, the arcuate outer portion of opposing end caps defines a space between the end caps configured to permit a rocker element to project through the space.

18. The linear motion bearing assembly of claim 17, further comprising a housing positioned about the bearing segments and said at least two end caps.

19. The linear motion bearing assembly of claim 17, further comprising a plurality of said bearing segments positioned adjacent each other and interlocked in the end caps.

20. The linear motion bearing assembly of claim 19, wherein each end cap has an arc length measured perpendicular to a longitudinal axis of the end cap and the bearing segment has an arc length measured perpendicular to a longitudinal axis the bearing segment, and wherein the arc length of an end cap is substantially equal to the sum of the arc lengths of the plurality of adjacent bearing segments.

* * * * *